Patented Dec. 30, 1930

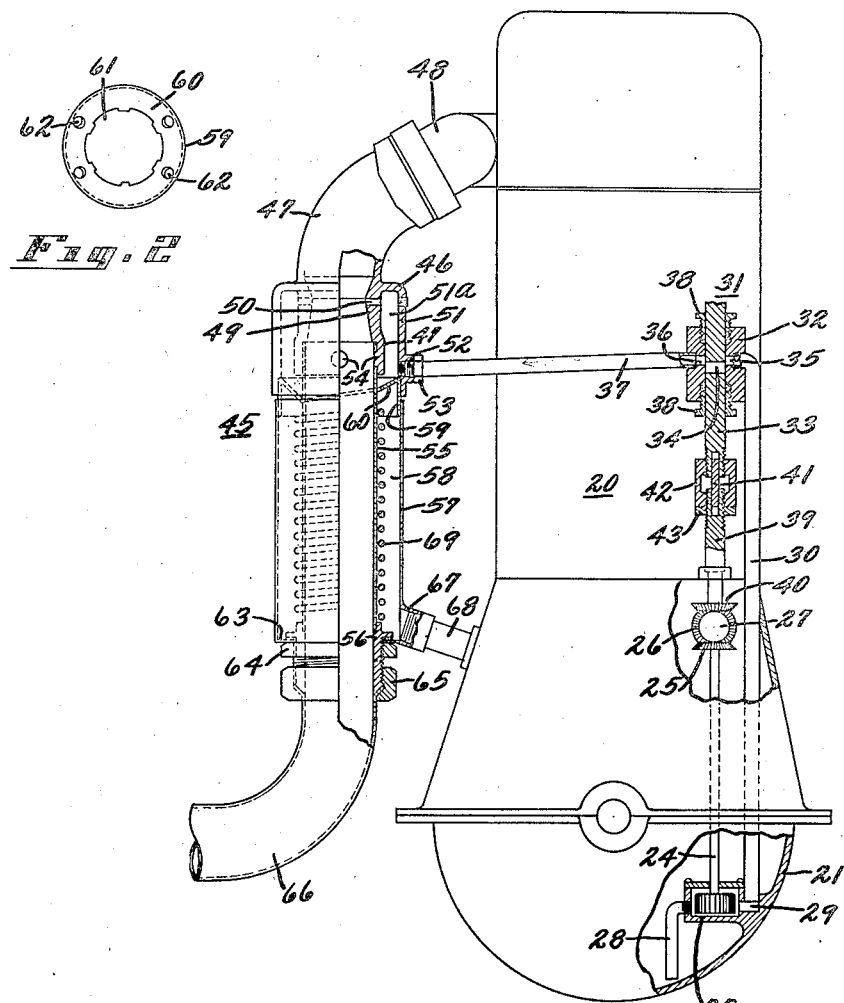

1,787,409

UNITED STATES PATENT OFFICE

CHARLES R. SHORT AND CHARLES L. LEE, OF DAYTON, OHIO, ASSIGNORS TO GENERAL MOTORS RESEARCH CORPORATION, OF DAYTON, OHIO, A CORPORATION OF DELAWARE

OIL-TREATING APPARATUS

Application filed May 9, 1923. Serial No. 637,812.

This invention relates to a lubricant purifying device and more particularly to that type of device used in combination with the lubricating system of an internal combustion engine.

In operating internal combustion engines at comparatively low temperatures and especially during the initial operation or what is termed the "warming up" period of the engine, it has been found that quite an appreciable amount of fuel drawn into the combustion chamber is in the unvaporized or liquid state. During the warming up period and for a substantial time thereafter, portions of this liquid fuel will be forced past the piston rings especially when the piston rings do not absolutely hug the cylinder walls, enter the crank case and mix with the lubricating oil therein, diluting the same and thereby substantially reducing its lubricating qualities. This dilution of the lubricating oil will tend to cause undue wear on most parts of the engine.

It is among the objects of the present invention to treat the lubricating oil in the system, whereby the lighter volatile fluids diluting the oil will be separated from the lubricant.

This object is attained by diverting a portion of the lubricating oil flowing through the lubricating system of the engine, directing this portion to a distilling device which is adapted to separate the more volatile fluids contained in the lubricating oil and after this separation directing the volatilized fluids to atmosphere by any suitable means and returning the refined or treated lubricant to the crank case of the engine.

Further objects and advantages of the present invention will be apparent from the following description reference being had to the accompanying drawings wherein a preferred form of the embodiment is clearly shown.

In the drawings:

Fig. 1 is a view partly in elevation and partly in section showing the lubricant distilling device applied to an internal-combustion engine.

Fig. 2 is a plan view of the oil distilling plate of the still.

Referring to the drawings, the numeral 20 designates an internal-combustion engine having a crank case 21 which acts as a reservoir for the lubricant supply of the lubricating system. The lubricant is circulated through the lubricating system of the engine by means of a pump 23 shown to be a gear pump in the present invention. The pump 23 is driven by means of a shaft 24 which is provided with a beveled gear 25 in driving connection with another beveled gear mounted on and driven by the cam shaft 27 of the engine. The numeral 28 designates the intake pipe of the pump 23 while the outlet port of the pump is designated by the numeral 29. This outlet port 29 may be connected with the lubricating system of the engine by any suitable means not shown in the present drawings. A pipe 30 also communicates with the outlet port 29 of the pump 23, said pipe 30 being connected with the means for metering the flow of oil from the lubricating system to the separating means.

This metering means is designated by the numeral 31 and includes a body portion 32 having a longitudinal channel in which the shaft 33 is adapted to rotate. The shaft 33 is provided with a transverse channel 34 which is adapted to communicate with ports 35 and 36 oppositely disposed in the body 32 of the metering device. The pipe 30 communicates with the port 35 which may be termed the inlet port of the metering device, while the outlet port 36 has a pipe 37 communicating therewith which pipe also communicates with the inlet port of the still as will be described hereinafter. Suitable packing nuts 38 are provided in the metering device about the shaft 33 for preventing leakage of oil at these points.

The rotating shaft 33 of the metering device 31 is driven by a shaft 39 having a beveled gear 40 which is in driving connection with the beveled gear 26 mounted on and driven by the cam shaft 27. The adjustable ends of the shafts 33 and 39 are provided with longitudinal slots in which the connecting link 41 is adapted to fit, thus causing a driving connection between the two shafts. These adjustable ends of the shafts 33 and 39 are provided with screw threads, one being right hand while the other is a left hand thread. These threaded portions of the shafts having an adjustable nut or coupling 42 associated therewith. It may be seen that when the adjusting nut 42 is turned relative to the two shafts, the shaft 33 will be caused to move toward or away from the shaft 39 depending upon the direction of rotation of the adjusting nut 42, due to the fact that longitudinal movement of the shaft 39 is prevented.

This will vary the relative position of the transverse channel 34 to the ports 35 and 36 thus varying the area of the channel through which the oil is adapted to pass when said channel 34 is moved in alignment with the opposite ports 35 and 36 during the rotation of the shaft 33.

Lock nut 43 is provided on the shaft 39, said lock nut being adapted to be screwed against the adjusting nut 42 to hold the same in adjusted position.

The means for separating the more volatile fluids from the lubricant or what is termed hereinafter as the distilling device is designated by the numeral 45.

The still 45 comprises a head portion 46 having formed integral therewith the conduit 47 adapted to be connected to the exhaust manifold 48 of the engine 20. Inside the lower portion of the conduit 47 there is provided a venturi 49 having a plurality of holes 50 at its restricted throat portion, said holes communicating with a space 51—a formed between the outer surface of the conduit 47 and a circular wall 51 formed integral with the conduit 47.

Communicating with the conduit 47 and supported thereby by means of the lugs 54 is a tube 55 which may be termed the heating element of the still. The method of securing this heating element to the conduit 47 is as follows: the tube 55 provided with holes at its one end is inserted in the mould in which the conduit 47 is to be cast. When the metal is poured in the mould the holes in the upper part of the tube 55 will be filled up with this metal, thus forming the lugs 54 as shown on the drawings.

Secured to the bottom end of the tube or heating element 55 by brazing or welding is a flanged coupling screw 56, the inside of said screw being provided with a channel which will form a continuation of the inside of the tube 55 when in position on said tube.

A casing 57 surrounds the tube or heating element 55 forming the passage way or chamber 58 which is termed the separating chamber of the still. The upper end of the casing 57 is held in position by means of the coupling sleeve 59, one portion of which projects into the bottom of the circular wall 51, while the other portion fits inside the casing 57. This coupling sleeve 59 is provided with an inwardly projecting flange 60 bent at such an angle as to cause an incline from the outer circumference to the inner edge of the central opening which fits about the tube or heating element 55. In this inner edge there are formed a plurality of cutaway portions 61 which provide passage ways at these points. A plurality of holes 62 are formed in the flange portion 60 of the coupling sleeve, said holes forming passage ways for purposes to be described hereinafter. The coupling sleeve 59 is positioned in the wall portion 51 so that the upper edge of the flange portion 60 is positioned slightly beneath the inlet port 52.

The casing 57 is provided at its lower end with an inwardly projecting flange 63 having a central opening through which the coupling screw 56 is adapted to project. A nut 64 screwed onto the coupling screw 56 is adapted to hold the flanged portion 63 against the flange formed on the coupling screw 56, thus tending to hold the casing 57 in position. A coupling nut 65 rigidly holds the associated conduit extension 66 in communication with the coupling screw 56 thereby forming a continuous passage from the inside of the tube 55 through the coupling screw 56 and the extension 66 to atmosphere. The casing 57 is provided with a snout 67 at its bottom, this snout having a pipe 68 communicating therewith which pipe also communicates with the crank case 21 of the engine. The heating unit 55 has a plurality of convolutions of wire 69 which act as a baffle for the oil in the still and which are heated up when the tube or heating element 55 is heated.

When the engine is operating and the cam shaft 27 is rotating the pump 23 through the shaft 24, oil will be drawn into the pump through the inlet port or pipe 28 and forced out of the outlet port 29 through the lubricating system of the engine, which directs oil to the various bearings, the cylinders and other operating parts of the motor. A portion of the oil will flow through the pipe 30, to the inlet port 35 of the metering element 31. Operation of the cam shaft 27 will rotate the shaft 39 by means of the beveled gears 26 and 40 which through the coupling 41 will rotate the shaft 33, thus permitting oil to flow from the inlet port 35 through the transverse channel 34 into and through outlet port 36 whenever the channel 34 is brought into alignment with the two aforementioned ports 35 and 36. It will be seen that this alignment takes place twice during each revolution of the shaft 33, thus causing an oil charge to be injected into the pipe 37 at each half revolution of the shaft 33. The oil will flow through the pipe 37, through the still inlet port 52 onto the downwardly inclined flange 60 of the coupling sleeve, thence through the passage ways formed by the notches 61 from whence this oil will trickle down over the wire convolutions on the heating element 55.

During the operation of the engine the hot exhaust gases flowing through the exhaust conduit 47 and the tube or heating element 55 will tend to heat this element 55 and its wire convolutions 69. The lubricant containing more volatile fluids such as gasoline, kerosene or water, trickling down over the heating wires 69 will be brought to a comparatively high temperature at which the said lighter fluids will become volatilized. The exhaust gas passing through the venturi 49 formed within the exhaust conduit 47 will set up a suction in the passage 50 thus creating a sub-atmospheric pressure within the space 51—a. This will cause the volatilized fluids to pass up through the holes 62 formed in the flange 60, enter the space 51—a and pass out through the passages 50 into said conduit 47, where they will mix with the flowing exhaust gases of the engine and pass to atmosphere through the pipe or heating element 55 and exhaust conduit extension 66. The heated lubricant will continue trickling down over the convolutions 69 until it reaches the bottom of the casing 57 whence this refined oil will flow through the outlet 67, pipe 68 and enter into the crank case 21 again mixing with the lubricant supply in the crank case.

It will be noted by reference to Figure 1 that pipe 68 is of relatively large cross section. The purpose of this is to permit vapors from the crankcase to pass upwardly through the pipe into the chamber 58 where they entrain with them distillates driven from the oil, the gaseous mixture then passing upwardly through the apertures 62 into space 51—a and thence through holes 50 into the exhaust conduit. The crankcase vapors in passing over the trickling stream of oil exert an evaporative action which assists in the removal of diluents.

In a lubricant purifying device of the type described, it is advantageous to provide a limiting device, inasmuch as when lubricating oil is delivered to the distilling device in large quantities, the heating unit of the still may not be able to heat the oil passing therethrough to a temperature high enough to cause the lighter fluids therein to become volatilized; thus it might occur that a comparatively large quantity of thin oils and gasoline would return to the crank case. Where the supply to the distilling device is limited, as in the present invention by shunting through the still continuously a small portion of the total oil passing through the pump, a sufficient heat is applied to the oil in the still to cause volatilization of the lighter fluids, thus permitting only the heavy refined lubricant to return to the crankcase from the still.

While the form of embodiment of the present invention as herein disclosed, constitutes a preferred form, it is to be understood that other forms might be adopted, all coming within the scope of the claims which follow.

What we claim is as follows:

1. In an oil purifying device for engines, the combination of a reservoir forming part of the engine lubricating system, of an oil refining chamber, means for delivering oil from the reservoir to the refining chamber, and exhaust conduit for the engine arranged adjacent the chamber so as to heat the latter, and means whereby the exhaust gases flowing in the exhaust conduit reduce the pressure in the refining chamber below atmospheric.

2. In an oil purifying device for engines, the combination with a lubricating system, of a still separate from the engine crankcase, means for delivering oil from the system to the still and means for returning oil from the still to the system, means for applying the heat of the exhaust gases to the still, and means operated by said exhaust gases for exerting suction on the oil in the still for producing an evaporative action thereon and removing distillates therefrom.

3. In an oil purifying device for engines, the combination with a lubricating system; of an exhaust conduit of the engine, including a Venturi tube; a still in thermal relation to the exhaust conduit and in communication with the throat of the Venturi tube; means for delivering oil from the system to the still; and means for returning the treated oil to the lubricant supply.

4. In an oil purifying device for engines, the combination with a lubricating system; of means for separating the impurities from the lubricant; means for delivering oil from the lubricating system to the separating means, including driven intermittent cut-off means for metering the flow of oil from the system to the separating means; and means for returning the treated oil to the system.

5. In a purifying device for engines, the combination with a lubricating system; of an engine exhaust conduit; a chamber in thermal relation with the conduit, said chamber and conduit having a common wall providing a heating surface; means for metering and delivering oil from the system to the chamber; and means for distributing this oil from the metering means in a thin stream over the heating surface in the chamber.

6. In a purifying device for engines, the combination with a lubricating system; of an engine exhaust conduit, including a Venturi tube; a chamber in thermal relation with the conduit and communicating with the throat of the venturi; means for metering and delivering oil from the system to the chamber; and means provided in the chamber at a lower level than the communication between the chamber and the Venturi tube for distributing the oil delivered thereto over the heating surface of the chamber.

7. In a purifying device for engines, the combination with a lubricating system; of a still including a heating chamber and inlet and outlet ports communicating with the chamber; an engine exhaust conduit passing through the heating chamber and adapted to heat said chamber; means for delivering oil from the lubricating system to the heating chamber; a Venturi tube provided in the exhaust conduit and communicating with the heating chamber; and a baffle plate provided in the still above its lowest portion and at a lower level than the oil inlet and the communication of said chamber with the inside of the exhaust conduit for distributing the inflowing oil evenly over the heated surface of the chamber and including openings whereby the volatilized fluids may be drawn from the heating chamber through the venturi communication with the still, into the said venturi and pass out with the exhaust gases flowing through said venturi.

8. In an oil purifying device for engines, having a crank case and an exhaust conduit, an oil refining chamber formed in part by the exterior of the exhaust conduit, there being an opening in the exhaust conduit communicating with the upper portion of said chamber and subject to the aspirating action of the gases in said conduit to withdraw vapors from said chamber, means for delivering oil from the crank case to said chamber, and means for conducting the refined oil from said chamber.

9. In the combination as defined in claim 8, means in said conduit adjacent said opening for increasing the velocity of the gases passing through said opening.

10. The combination of an internal combustion engine having a lubricating system and an exhaust conduit, a still arranged to be heated by the exhaust gases, means for supplying said still with oil from the system and returning the refined oil thereto, and means operated by said exhaust gases for exerting suction on the gases in said still, said last named means including devices for increasing the velocity of the said exhaust gases at the point where the suction is produced.

11. In an oil rectifying device, the combination of an automobile engine having a lubricating system, a still, means for diverting oil from the system through the still, means for returning the purified oil to the system, and a driven metering device arranged in said first named means for controlling the flow of oil to the still.

12. In an oil rectifying device, the combination of an automobile engine having a circulating lubricating system, a still, a conduit for feeding oil from the system to the still, means for returning the purified oil to the system, and a metering device arranged in said conduit and comprising an engine driven means having a passage therethrough for intermittent registration with the passage through said conduit to control the flow of oil to the still.

13. In the combination defined in claim 12, means for adjusting said driven means to vary the degree of registration of said passages.

14. The combination of an internal combustion engine having a heated oil distillation chamber, means for supplying oil to said chamber, a conduit for returning distilled oil from said chamber to the engine, and means for passing an evaporative medium in a continuous stream through said conduit in a direction opposite to that in which the oil flows.

15. In an oil purifying device for use in connection with an engine, the combination of an oil purifying chamber separate from the engine crankcase, means for passing a stream of oil through said chamber and returning it to the crankcase, means for causing an evaporative flow of gaseous medium in a continuous stream from the crankcase through the chamber in contact with said oil stream and in a direction opposite to the direction of its flow for effecting removal of diluents therefrom, and means for discharging said gaseous medium from the said chamber.

16. The combination of an internal combustion engine having a crankcase, a still for refining lubricating oil, means for applying suction to said still, means for supplying oil to said still, a conduit for returning refined oil to the crankcase and discharging above the level of the oil therein, said conduit being of larger capacity than said oil supplying means to permit passage of vapors from the crankcase into the still.

17. The combination of an internal combustion engine having a crankcase, a still for refining lubricating oil, means for heating said still, means for supplying oil to said still, a conduit for returning refined oil to the crankcase and discharging above the level of the oil therein, said last named conduit being of larger capacity than said oil supplying means to permit the oil to trickle in a thin stream through the still, a vapor outlet for the still, said conduit, still and outlet providing an unobstructed path for the discharge of vapors from the crankcase, said vapors in their passage effecting evaporation of diluents from the engine oil.

18. A still comprising a conduit for the passage of a heating medium, a distillation chamber surrounding said conduit, and a heating element comprising a coil of good heat conducting material wound around said conduit, means for distributing the entering oil upon the turns of the coil, and means at the lower end of the chamber for discharging the purified oil.

19. In the combination as defined in claim 18, said distributing means comprising an annular baffle secured to the walls of said chamber.

20. The combination of an automobile engine having a pressure lubricating system, an oil treating device, means for diverting oil from the system thru the device, means for returning treated oil from the device to the system and a driven metering device arranged in said first-named means for controlling the flow of oil through the treating device.

21. The combination of an automobile engine having a circulating lubricating system, an oil treating device, a conduit for feeding oil from the system to the device, a conduit for the return of oil from the device to the system and a driven rotary cut-off device for controlling the flow of oil through the treating device.

22. The combination of an internal combustion engine having an oil purifying device, means for supplying oil to the device, a conduit for returning purified oil from the device to the engine, and means for passing an evaporating medium through said conduit in a direction opposite to the direction of oil flow.

23. The combination of an internal combustion engine having a lubricating system including a crank case serving as a lubricant reservoir, an oil purifying device, means for supplying oil from the system to the device, a conduit for returning purified oil from the device to the crank case, and means for drawing air from the crank case through said conduit in a direction opposite the direction of oil flow to effect evaporation of diluents from the returning oil stream.

24. In a lubricating system, the combination of means for circulating oil, means for conducting oil from the circulating means to the bearings, an oil treating device, a conduit for supplying oil from the system to the treating device, a driven metering device interposed in said last-named means for controlling the flow of oil to the treating device, and means for returning the treated oil to the system.

25. In the combination as defined in claim 24, said metering device comprising a rotary cut-off valve.

26. In an oil purifying device for engines, the combination with a lubricating system, of a still separate from the engine crankcase, means for delivering oil from the system to the still, and means for returning oil from the still to the system, an exhaust gas passage adjoining the still, said passage and still having a common wall for conveying heat to the still, and a port in said wall directly connecting the passage and the still above the level of the oil therein, said port being subject to the aspirating effect of exhaust gases flowing through said passage for withdrawing diluent vapors from the still into the passage.

27. The combination of an internal combustion engine having a lubricating system including a crankcase serving as a lubricant reservoir, an oil purifying chamber, means for supplying oil from the system to the chamber and for returning purified oil to the system, means for admitting air from the crankcase to the chamber, and means for withdrawing vapors from the chamber thereby causing an evaporative flow of crankcase vapors through the chamber to remove diluents from the engine oil.

28. The combination of an internal combustion engine having a crankcase, a still for refining lubricating oil, means for heating said still, means for supplying oil to said still, a conduit for returning refined oil to the crankcase and discharging above the level of the oil therein, said last named conduit being of larger capacity than said oil supplying means to permit the oil to trickle in a thin stream through the still, and means for applying suction to the still to draw vapors from the crankcase upwardly through the conduit in opposition to the flow of oil therein.

29. In an oil purifier for internal combustion engines, a purifying chamber, means for introducing oil into said chamber, means to permit vapor to escape from said chamber, a pipe communicating with said chamber and the crankcase to conduct simultaneously vapor from the crankcase to the chamber and oil from the chamber to the crankcase.

30. In an oil purifier for internal combustion engines having a source of suction, a chamber, a pipe leading to said source of suction from said chamber for drawing vapors therefrom, a pipe communicating with the crankcase for delivering vapors to said first named pipe, means for introducing oil from the crankcase into the chamber, and means connecting said chamber with said second named pipe for passing purified oil through said pipe in the opposite direction to the movement of the vapors from the crankcase.

In testimony whereof we hereto affix our signatures.

CHARLES R. SHORT.
CHARLES L. LEE.